R. SHAND.
ELECTRICAL MEASURING INSTRUMENT.
APPLICATION FILED JULY 7, 1914.
1,236,114. Patented Aug. 7, 1917.
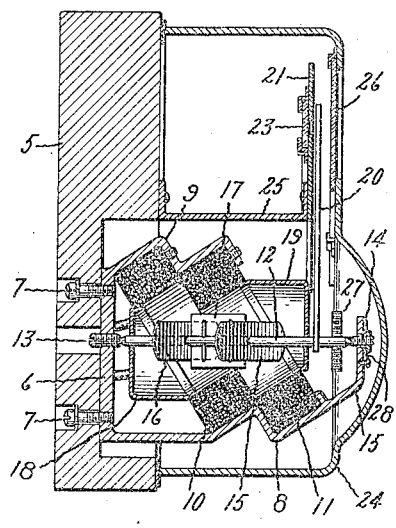
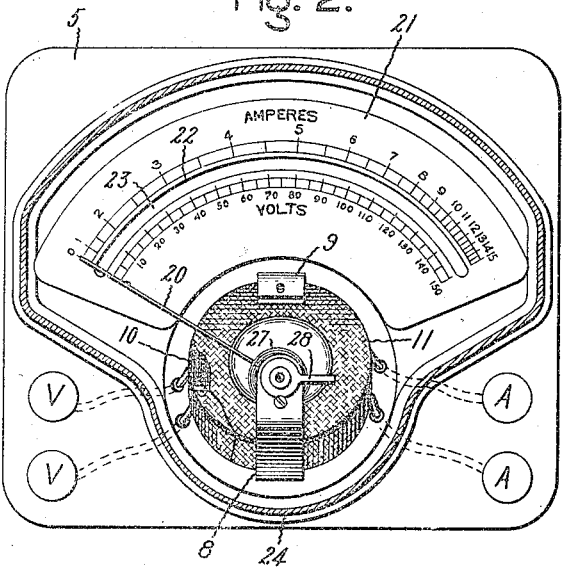
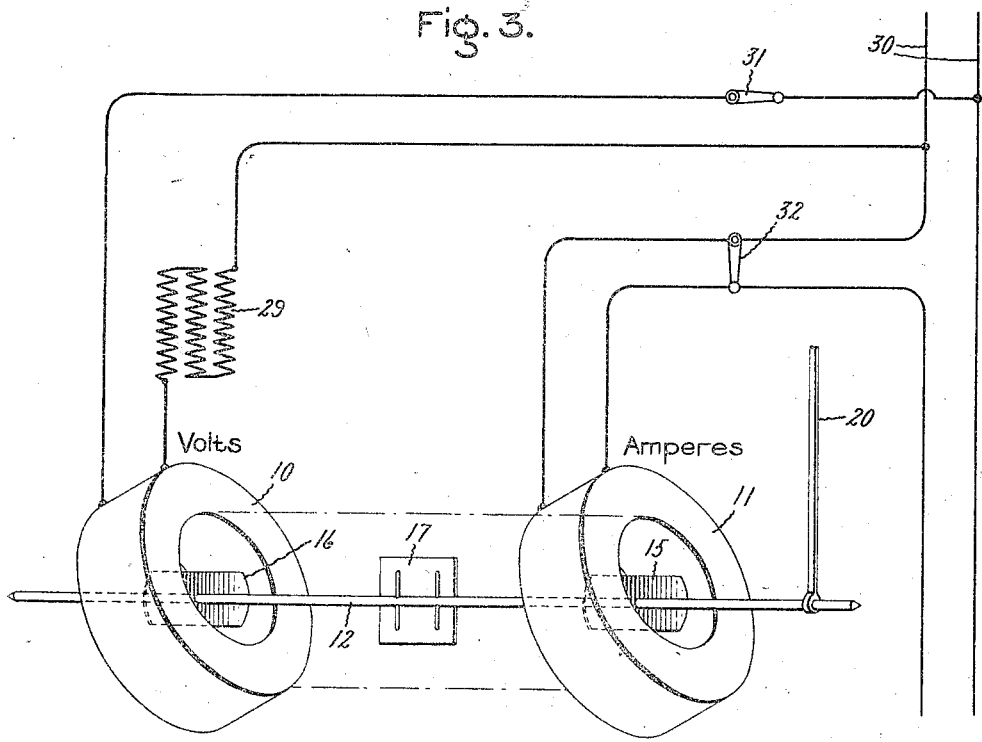
Witnesses:
Inventor,
Robert Shand,
by
Att'y.

UNITED STATES PATENT OFFICE.

ROBERT SHAND, OF LYNN, MASSACHUSETTS, ASSIGNOR TO GENERAL ELECTRIC COMPANY, A CORPORATION OF NEW YORK.

ELECTRICAL MEASURING INSTRUMENT.

1,236,114.  Specification of Letters Patent.  Patented Aug. 7, 1917.

Application filed July 7, 1914. Serial No. 849,402.

*To all whom it may concern:*

Be it known that I, ROBERT SHAND, a citizen of the United States, residing at Lynn, county of Essex, State of Massachusetts, have invented certain new and useful Improvements in Electrical Measuring Instruments, of which the following is a specification.

My invention relates to electrical measuring instruments and especially to indicating instruments particularly adapted for alternating current measurements.

The object of my invention is to provide a novel and improved duplex electrical measuring instrument, and particularly a novel and improved duplex electrical measuring instrument for use on alternating current circuits. More specifically the object of my invention is to provide a duplex ammeter and voltmeter of the inclined coil type. A further object of my invention is to provide a duplex instrument having an especially efficient damping characteristic whereby the instrument is peculiarly adapted for use on an alternating current circuit. Other objects of my invention will be apparent from the following description.

The novel features of my invention which I believe to be patentable are definitely indicated in the claims appended thereto. The construction and mode of operation of a duplex electrical measuring instrument embodying the features of my invention will be understood from the following description taken in connection with the accompanying drawings, in which:—

Figure 1 is a sectional view of my novel and improved duplex instrument; Fig. 2 is a top view partly in section of the instrument; and Fig. 3 is an explanatory diagrammatic view of the electrical connections.

The duplex instrument of my invention comprises two adjacent current carrying coils of the inclined coil type, each having an independent coöperating magnetizable member secured to a common pivotally mounted shaft. The instrument, thus, in substance comprises an inclined coil ammeter element and an adjacent inclined coil voltmeter element having independent magnetizable members secured to an operatively common pivotally mounted shaft. Between the magnetizable members and secured to the shaft, I place a damping vane in such a manner that the magnetizable members roof and bottom the damping vane thereby materially increasing the damping efficiency. In addition, I propose to close the non-adjacent ends of the current carrying coils whereby the magnetizable members and the damping vane are positioned in a substantially closed chamber thus further increasing the damping efficiency. This increase in damping efficiency is an extremely desirable feature, particularly in a portable indicating instrument for use on alternating current circuits.

My novel and improved duplex measuring instrument comprises a supporting base 5 of wood or other suitable insulating material. A bracket 6 is secured to the supporting base by means of screws 7. The bracket has a lower step portion 8 and an upper step portion 9 whereby two inclined current carrying coils 10 and 11 may be suitably and securely mounted in their respective operative positions in the instrument. A shaft 12 is pivotally mounted at one end in a pivot bearing 13 secured to the base of the bracket 6 and at the other end in a pivot bearing 14 secured to an extension 15 of the lower step portion 8 of the bracket.

It will be observed from the drawings that the coils 10 and 11 are arranged in an inclined position with respect to the shaft 12. The coils are furthermore directly adjacent, that is, the bottom of coil 11 is adjacent to and in contact with the top of coil 10. The arrangement is such that one coil is positioned directly above the other so that in looking down upon the instrument, as in Fig. 2 of the drawings, every portion of the bottom coil 10 is directly beneath the corresponding portion of the top coil 11.

A magnetizable member 15, such as a vane of iron, is secured to the shaft 12 and within the magnetic influence of the coil 11. A second magnetizable member 16 is secured to the shaft 12 and within the magnetic influence of the coil 10. The members 15 and 16 are positioned in parallel planes inclined to the axis of the shaft 12, as will be clearly seen in Figs. 1 and 2 of the drawings.

A damping vane 17, of mica or other suitable material, is secured to the shaft 12 between the magnetizable members 15 and 16. It will thus be evident that the magnetizable members roof and bottom the damping vane, so that the damping effect is materially increased. An end cap 18 surrounds the shaft 12 and closes the open end of the coil 10. Another end cap 19 surrounds the shaft 12 and closes the open end of the coil 11. It will thus be seen that the end caps 18 and 19 form with the insides of the coils 10 and 11 a substantially closed chamber in which the magnetizable members and the damping vane are positioned. The inclosing of the damping vane in a chamber of this character very materially increases the damping effect.

An indicating member such as a pointer 20 is secured to the shaft 12 and sweeps across a suitable scale 21 graduated to read in amperes and volts. The scale is supported by a bracket 25 secured to the base 5 and has a slot 22 behind which is positioned a mirror 23 in the usual manner. A control spring 27 has one end secured to the shaft 12 and the other end secured to an adjustable fixed arm 28. The arm 28 is carried by the extension 15 of the bracket and is adapted to be adjusted so that the tension of the control spring can be suitably varied to bring the pointer 20 to its zero position on the scale. A cover member 24 is secured to the base 5 and incloses the operative elements of the instrument. A glass window 26 is secured to the cover above the scale 21.

The electrical connections of the instrument will be understood by reference to Fig. 3 of the drawings. The coil 10 is a voltmeter coil and has connected in series therewith a resistance 29 of the usual character. The coil is illustrated in the figure as connected directly across the conductors 30 of an electrical installation. A switch 31 serves to electrically disconnect the coil at will. The coil 11 is an ammeter coil and is adapted to be connected in series with one of the conductors 30. A switch 32 is arranged in shunt to the ammeter coil 11 so that when the switch is in the position indicated in the drawings the ammeter coil is short circuited and no current flows therein. It will be observed from Fig. 2 of the drawings that the voltmeter and ammeter coils have independent terminals. Thus the voltmeter coil 10 has two independent terminals indicated by V, while the ammeter coil 11 has two independent terminals indicated by A. The voltmeter and ammeter terminals are as far apart as possible on opposite sides of the base 5.

The operation of the instrument will be evident to those skilled in the art from the foregoing description. Since the ammeter coil and the voltmeter coil have independent terminals the instrument can be permanently connected to an installation as indicated in Fig. 3 of the drawings. With the connections as represented, the instrument will indicate the voltage between the conductors 30 of the installation. It will be obvious that the voltmeter coil 10 and its cooperating magnetizable member 16 act as an ordinary inclined coil voltmeter. Due, however, to the construction which I am enabled to use in the duplex instrument the damping is very materially increased so that the instrument is peculiarly adapted for measuring alternating current voltages. If it is desired to use the instrument as an ammeter, the switch 31 is opened, and then the switch 32 opened. The opening of the switch 31 disconnects the voltmeter coil while the opening of the switch 32 includes the ammeter coil in series with one of the conductors 30. The ammeter coil 11 and its cooperating magnetizable member 15 now act as an ordinary inclined coil ammeter. It will thus be evident that I have provided a very compact construction of duplex measuring instrument which is adapted to measure both amperes and volts without any interference due to the duplex character of the instrument.

I have explained my invention by illustrating and describing a special embodiment thereof, but it will be understood that the invention may be embodied in many other forms than that shown and described. I, accordingly, do not wish to be restricted to the particular form and construction disclosed herein by way of example for the purpose of setting forth my invention in accordance with the patent statutes. The terms of the appended claims are, therefore, not restricted to the precise structure disclosed but are intended to cover all changes and modifications within the spirit and scope of my invention.

What I claim as new and desire to secure by Letters Patent of the United States, is:—

1. An electrical measuring instrument comprising a pivotally mounted shaft, two adjacent current carrying coils surrounding said shaft, each of said coils being arranged in an inclined position with respect to the shaft, an independent magnetizable member for each coil mounted on said shaft, a damping vane secured to said shaft between said magnetizable members, means for closing the non-adjacent ends of the coils whereby the magnetizable members and the damping vane are positioned in a substantially closed chamber, and an indicating member operatively related to said shaft.

2. A duplex electrical measuring instrument comprising a stationary ammeter coil and a stationary voltmeter coil each of the inclined coil type, a pivotally mounted shaft operatively common to both coils, an independent magnetizable member for each coil mounted on said shaft, a damping vane secured to said shaft between said magnetizable members, means for closing one end of each coil whereby a substantially closed chamber is formed inclosing said magnetizable members and said damping vane, independent terminals for each of said coils, and an indicating member operatively related to said shaft.

3. An electrical measuring instrument comprising a pivotally mounted shaft, two adjacent current carrying coils surrounding said shaft, each of said coils being arranged in an inclined position with respect to the shaft, an independent magnetizable member for each coil mounted on said shaft, a damping vane secured to said shaft between said magnetizable members, two end caps surrounding said shaft and adapted to close the non-adjacent ends of said coils whereby said magnetizable members and said damping vane are positioned in a substantially closed chamber, and an indicating member operatively related to said shaft.

4. An electrical measuring instrument comprising a pivotally mounted shaft, a current carrying coil surrounding said shaft and arranged in an inclined position with respect to the axis of the shaft, a second current carrying coil surrounding said shaft directly adjacent the first coil and arranged above the first coil so that every portion of the second coil is directly above the corresponding portion of the first coil, an independent magnetizable member for each coil mounted on said shaft, a damping vane secured to the shaft between said members, end caps surrounding said shaft and closing the non-adjacent ends of the coils whereby the magnetizable members and the damping vane are positioned in a substantially closed chamber, a control spring for said shaft, and an indicating member operatively related to the shaft.

5. An electrical measuring instrument comprising a pivotally mounted shaft, a current carrying ammeter coil surrounding said shaft and arranged in an inclined position with respect to the shaft, a current carrying voltmeter coil surrounding said shaft and similarly arranged in an inclined position with respect to the shaft, said coils being arranged one above the other with their adjacent coil sides mechanically in contact and so that every portion of the top coil is directly above the corresponding portion of the bottom coil, two magnetizable members carried by said shaft and arranged in parallel planes inclined to the axis of the shaft, one of said magnetizable members being operatively positioned within the magnetic influence of the ammeter coil and the other magnetizable member being operatively positioned within the magnetic influence of the voltmeter coil, an air damping vane secured to said shaft between said magnetizable members, and an indicating member operatively related to said shaft.

6. An electrical measuring instrument comprising a pivotally mounted shaft, a current carrying ammeter coil surrounding said shaft and arranged in an inclined position with respect to the shaft, a current carrying voltmeter coil surrounding said shaft adjacent to said ammeter coil and similarly arranged in an inclined position with respect to the shaft, two magnetizable members carried by said shaft and arranged in parallel planes inclined to the axis of the shaft, one of said magnetizable members being operatively positioned within the magnetic influence of the ammeter coil and the other magnetizable member being operatively positioned within the magnetic influence of the voltmeter coil, a damping vane secured to said shaft between said magnetizable members, two end caps surrounding said shaft and adapted to close the non-adjacent ends of said coils whereby a substantially closed chamber is formed inclosing said magnetizable members and said damping vane, and an indicating member operatively related to said shaft.

In witness whereof, I have hereunto set my hand this first day of July, 1914.

ROBERT SHAND.

Witnesses:
 JOHN A. MCMANUS, Jr.,
 JOHN T. BEECHLYN.